United States Patent [19]

Roemer et al.

[11] 3,916,304
[45] Oct. 28, 1975

[54] METHOD FOR NONDESTRUCTIVE TESTING OF WELD CLUSTERS

[75] Inventors: Louis E. Roemer; Donald C. Thorn, both of Akron, Ohio

[73] Assignee: The University of Akron, Akron, Ohio

[22] Filed: Jan. 17, 1974

[21] Appl. No.: 435,010

[52] U.S. Cl. .................................. 324/64; 324/65 R
[51] Int. Cl.² .......................................... G01R 27/14
[58] Field of Search ............................ 324/64, 65 R

[56]         References Cited
          UNITED STATES PATENTS

| 3,192,474 | 6/1965 | Cherry | 324/64 X |
| 3,303,418 | 2/1967 | Rose | 324/64 |
| 3,609,537 | 9/1971 | Healy et al. | 324/64 |
| 3,611,125 | 10/1971 | Press et al. | 324/64 |
| 3,676,775 | 7/1972 | Dupnock et al. | 324/64 |
| 3,735,253 | 5/1973 | Seger | 324/64 |

*Primary Examiner*—Stanley T. Krawczewicz
*Attorney, Agent, or Firm*—Hamilton, Renner & Kenner

[57]            ABSTRACT

Disclosed is a method for the nondestructive testing of weld clusters having at least a first and a second weld joining metal elements including the steps of injecting a current into one of the elements from a suitable source by contacting each of the elements with a current probe therefrom. A first current density is then measured between the current probe and the first weld and a second current density is measured between the current probe and the second weld and the first current density is then compared with the second current density so as to determine the relative quality of said welds.

6 Claims, 4 Drawing Figures

METHOD FOR NONDESTRUCTIVE TESTING OF WELD CLUSTERS

BACKGROUND OF THE INVENTION

The present invention relates to a nondestructive process for testing and identifying faulty spot welds within a spot weld cluster of at least two welds. More specifically, the invention relates to a process for determining the quality of spot welds based on the spatial current density observed in a weld region with the aid of instruments.

Heretofore in the field of weld testing, the prevalent practice has usually been to spot-check a small number of welds at random to determine whether the welds had a sufficient or desirable tensile strength. However, such testing resulted in the destruction of the weld and often rendered the spot welded metal items as scrap. For example, in the automotive industry where spot welding is extensively used, the only way to assure quality control of welded items such as car doors or the like is to physically test every tenth car door. This, of course, creates a great deal of expense and relegates the car doors to the scrap pile.

Another method, less frequently used, is the utilization of X-rays. Due to the potential and actual radiation hazards, the necessity for developing the exposed film, the high cost of equipment and the need for skilled men to analyze the film, this method has not been commonly employed. Moreover, the use of X-ray equipment in assembly line operations such as in the automotive field is highly impractical due to the rapid pace of the assembly line, the frequent need for multiple X-rays of a single part and the time required to develop the film.

Another method of weld analysis resides in passing a current through a weld cluster and measuring the resistance therethrough, because a good weld has a much lower resistance than an inferior weld. Thus, if a cluster of welds is poor, and a current is passed from one metal surface, through the welds and to the other metal surface joined thereby, the resistance when measured will be noticeably higher than the resistance of an acceptable weld cluster.

However, it does not follow that if the resistance measured is low, that all of the welds within the cluster are acceptable. For instance, if one or several of the welds are inferior, but at least one of the welds is acceptable, the total resistance measured will always be less than the least individual resistance, i.e., the resistance of the good weld. Therefore, a low reading merely indicates that at least one of the welds within a cluster is good but does not necessarily mean that all the welds in the cluster are good. Therefore, it has not been possible to specifically determine the quality of each.

SUMMARY OF THE INVENTION

It is therefore a primary object of the present invention to provide a method which tests clusters of spot welds by measuring spatial current density in the weld region.

It is another object of the present invention to test spot weld clusters, as above, by injecting a current into one of the welded surfaces which flows through the welds and exits from the other welded surface and by measuring the potential difference across a portion of the welded surface.

It is still another object of the present invention to test spot welds, as above, whereby various potential differences are readily measured between the point of current injection and the welds to be tested.

It is a still further object of the present invention to test spot welds whereby the measured potential differences are related to the quality of the welds tested.

These and other objects of the present invention, together with the advantages thereof over existing and prior art forms which will become apparent from the following specification, are accomplished by the means hereinafter described and claimed.

In general, a method for the nondestructive testing of weld clusters having at least a first and a second weld joining metal elements includes the steps of injecting a current into one of the elements from a suitable source by contacting each of the elements with a current probe. A first current density is then measured between the current probe and the first weld and a second current density is measured between the current probe and the second weld with the first current density then being compared with the second current density to determine the relative quality of said welds.

Each additional weld within a weld cluster may be checked in this manner. The process may also include an initial check of the total resistance of the cluster of welds to ascertain a high or a low resistance. A high resistance indicates all welds therein are inferior and that further testing, according to the preferred method, is not necessary.

DESCRIPTION OF THE PREFERRED EMBODIMENTS

Figure 1:
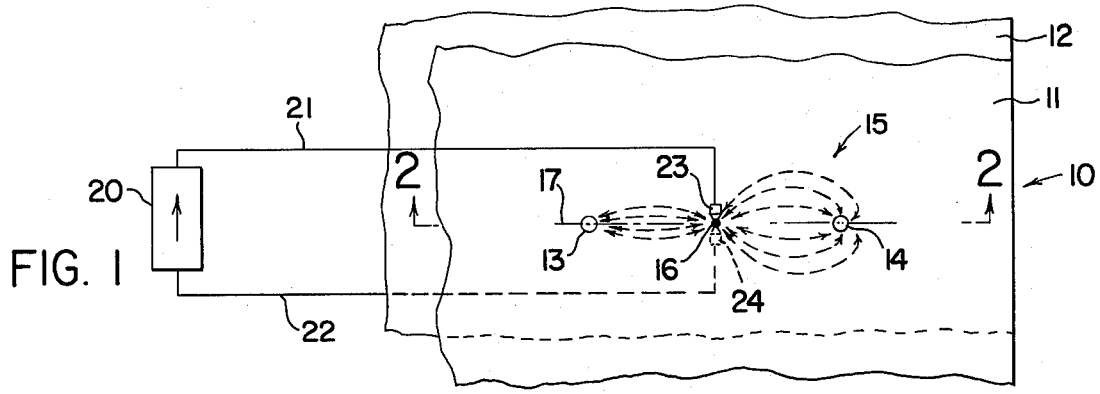
FIG. 1 is a plan view of two elements spot welded together schematically depicting a current source and the spatial current density flowing between two welds of different quality from a point of current injection.
Figure 2:
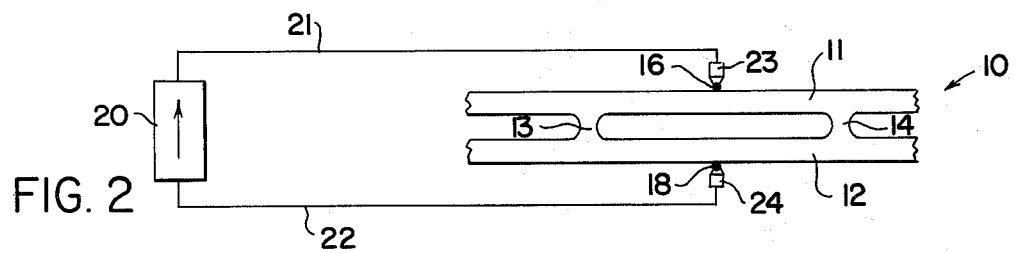
FIG. 2 is a cross section taken substantially on line 2—2 of FIG. 1 depicting the welds connecting the elements and the positioning of the current probes.
Figure 3:
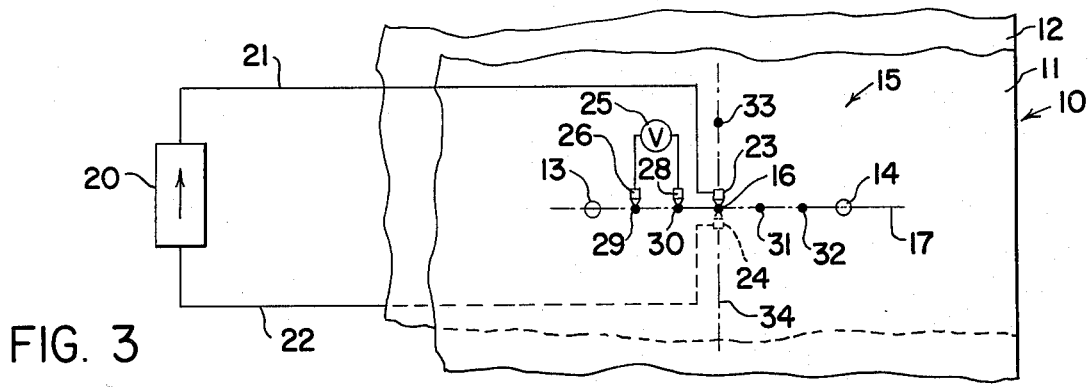
FIG. 3 is a plan view of two elements welded together by a two weld cluster, schematically depicting a current source, a potential difference measuring device and the positioning thereof; and, FIG. 4 is a plan view of two elements welded together by a plurality of four spot welds and schematically depicting the current source, potential measuring device and positioning thereof.

Spot welding generally refers to a type of weld which is used to join metal elements in the fabrication of various components, assemblies and units. A typical spot weld type joinder is shown in FIGS. 1–3, wherein an article, referred to generally by the numeral 10, is formed by two metal elements 11 and 12 capable of being joined together by at least two spot welds, 13 and 14, which form a weld cluster, generally indicated by the numeral 15. Although many welds may exist on a large welded article, only two welds are shown in the embodiment depicted by FIGS. 1–3.

In the fabrication of various articles by spot welding, the welds are usually made by an automatic welding machine. Hence, conformity of the welds with respect to size is usually excellent. Even in the production of articles wherein manual spot welding techniques are used, size conformity is usually obtained. A primary consideration in determining the quality of a weld relates to its binding or tensile strength, which is generally dependent upon the cross sectional area of the weld. Should a particular weld have a fault, a fracture or other irregularity, it will, of course, have a diminished tensile strength.

It is generally known that a proper weld offers less resistance to the flow of current therethrough than a weld improperly made, that is, having a fault, a fracture or other irregularity. If an output of steady and unvariable current is injected into the element 11 at a point 16 midway between welds 13 and 14 on a centerline 17, it will flow through the plate 11, through the welds 13 and 14 to plate 12, and be permitted to exit therefrom as at point 18, it may be expected to flow equally through both welds 13 and 14. However, if one of the welds, 13 in FIG. 1, is of poor quality its resistance will be higher than that of a good weld 14, and more of the current may be expected to flow through weld 14 than through weld 13. In FIG. 1, the greater flow of current through the good weld 14 than the poor weld 13, is depicted schematically by the arrows flowing from the probe 23 to the welds 13 and 14. The arrows actually indicate that the spatial current density between the two welds 13 and 14 is nonuniform and because of this shift in the density, measurements of the potential differences between various locations in the weld cluster region 15, will differ.

A typical testing apparatus according to the preferred method of the present invention for nondestructively testing a weld cluster 15 includes a current generator indicated by the numeral 20. As is well known to one skilled in the art, such a generator has a steady and unvariable current output regardless of the voltage drop across it.

Typical resistances shunted across the current source may generally range from about 10 ohms to about 10,000 ohms and even higher depending upon the type of testing and degree of current output desired. As to the type of current generated, while DC may be used, AC is preferred. The current output frequency may generally be any other than 60Hz in order to avoid electric signal pickup from motors or other EMF sources in the fabrication area. Accordingly, a narrow band of frequencies selected within the range from about 400Hz to about 1KHz has been found to give good results. During testing, the shunt resistance across the terminals of the current source of a magnitude many times greater than the resistance of the welds being tested is preferable so that the current will not fluctuate appreciably with varying resistances in the welds.

Wires 21 and 22, leading from the generator 20 are connected to probes 23 and 24, respectively. The current probes preferably are constructed with a very hard tip such as tungsten carbide in order to withstand repeated contacts with metal surfaces. In order to produce a flow of current through the welds 13 and 14, one probe 23 is urged against the element 11 as at point 16 midway between the welds 13 and 14 and the other probe 24 is urged against the element 12 at point 18 also midway between the welds 13 and 14.

While the current is flowing through the welded article 10, various potential differences are measured with a standard potential difference measuring apparatus such as a voltmeter 25 having at least two contacts 26 and 28. The contacts 26 and 28 may be attached to either element 11 or 12 and in FIG. 3 are shown in contact with the upper element 11. Placement of the contacts 26 and 28 to test a two weld cluster 15, is preferably in an area between the welds 13 and 14 on either side of the current probe 23. By placing the contacts at points 29 and 30 the potential difference between these points located between weld 13 and the current probe 23 is measured and likewise, by placing the contacts of voltmeter 25 at points 31 and 32, the potential difference between these points located between weld 14 and the current probe 23 is measured.

Although the potential differences can be measured at various locations within the weld cluster 15, it is important that the spacing of the voltmeter contacts 26 and 28 for each reading be identical and symmetrical with respect to the point of current injection 16. That is, the distance between points 29 and 30 must be identical to the distance between points 31 and 32 and the distance between points 16 and 30 must be identical to the distance between points 16 and 31.

If both welds 13 and 14 are acceptable the potential differences will be identical or very nearly similar, indicating an even distribution of current density and hence welds of equal quality. The welds will also be acceptable, for if both welds were unacceptable, the voltage across current source 20 would have increased substantially when the current probes 23 and 24 were attached. This could be observed with a voltmeter (not shown) connected across the current source 20.

If the weld 13 is unacceptable and weld 14 is acceptable, then the potential difference between points 29 and 30 will be less than the difference between points 31 and 32, thereby differentiating the good weld 14 from the poor weld 13. For example, two pieces of metal having a thickness of 0.0625 inches were spot welded in two places similar to the article 10 depicted in FIG. 3. The weld 13 was intentionally made inferior to the weld 14 which was made to be acceptable. The article 10 was thereafter tested by injecting current, approximately 15 to 20 milliamps into the upper piece of metal. A voltage measurement taken between points 29–30 with voltmeter 25, read 4.4 microvolts and between points 31 and 32, read 6.6 microvolts or an increase of approximately 50 percent. When the welds were thereafter destructively tested by pulling apart the two pieces of metal the inferior weld 13 failed at 85 pounds while the acceptable weld 14 did not fail until 505 pounds of force were exerted. In a similar test on another sample, a voltage measurement taken between points 29 and 30 read 4.4 microvolts and taken between points 31 and 32 read 5.4 microvolts. Subsequent testing revealed failure in the poor weld after 105 pounds of force and failure in the good weld after 550 pounds of force.

Measurements could also be taken by placing one contact at either side of the point 16 such as at points 29 and 32 or points 30 and 31, so long as the distances from point 16 were equal. Little or no potential difference noted from such a measurement would indicate a uniform current density between point 16 and the welds 13 and 14 and hence welds of equal or near equal quality. Similarly, a relatively high reading indicates a nonuniform current density therebetween and an inferior weld located at the side of point 16 which is at the lesser potential indicative of a lesser current density. A measurement could also be taken with one contact 26 on a point 33, on the vertical axis 34, passing through point 16, and with the other contact 28 on the point 29 or 30. Then a symmetrical measurement from point 33 to point 32 or 31 would be made. In each instance the higher readings will indicate the inferior welds. Thus, it is evident that similar potential difference measurements can be taken at various points around the weld cluster 15, within the spirit of the present invention.

Figure 4:
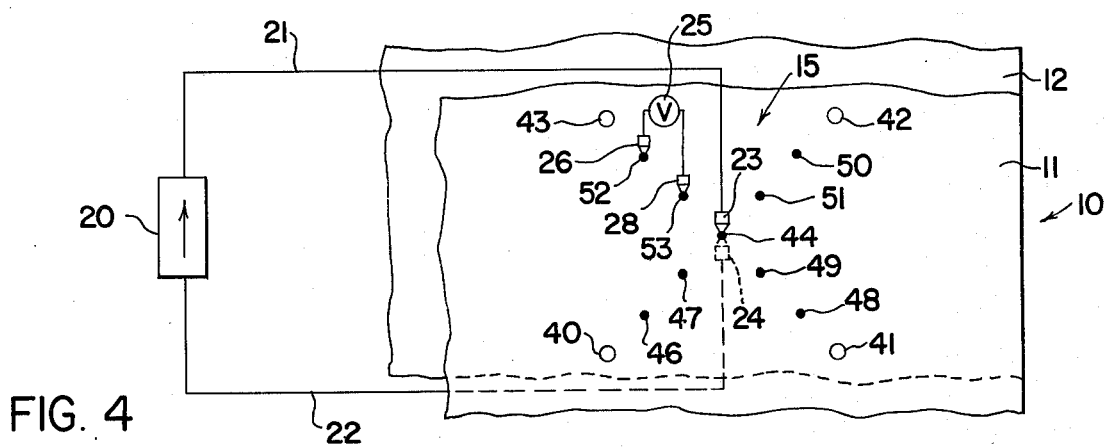

If there are more than two welds in a cluster 15, as depicted in FIG. 4, such as welds 40, 41, 42 and 43, it is first necessary to determine a geometric center 44 at which to inject the current. Potential difference measurements can then be taken at point locations such as 46–47, 48–49, 50–51 and 52–53 and compared. One or more readings higher than the others will indicate the weld or welds of inferior quality.

If weld clusters 15 are to be tested industrially where the welded articles 10 are all alike in configuration and location of welds, then it may be expedient to construct a jig or table which will quickly receive the article 10, and inject the current at a predetermined geometric center of each cluster 15. A plurality of voltmeter contacts could also be placed in exact symmetrical alignment between the various welds and the point of current injection to measure and compare the various potential differences. In situations where the welds may be more randomly distributed or more numerous, small clusters may be determined and tested individually. It has been found that the effect of the remaining welds within a fairly large, random weld cluster will be negligible as to potential differences so long as the injecting current probe is located as near as possible to the center of two or more welds, constituting a smaller cluster, when these welds are tested.

Thus it should be evident that the disclosed process carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A method for the nondestructive testing of weld clusters having a plurality of welds joining two metal elements comprising the steps of: injecting a current into one of the elements by contacting each of the elements with a current probe at the approximate geometric center of the welds within the cluster, measuring the total resistance of all the welds within the weld cluster thereby determining the existence of clusters in which all welds are of a poor quality, measuring a first current density between said current probe and one weld, measuring additional current densities between said current probe and the additional welds of the weld cluster, and comparing said first current density with each said additional current density so as to determine the relative quality of the welds.

2. A method for the nondestructive testing of weld clusters, as in claim 1, wherein said current density is measured by a voltmeter which determines the potential difference across a portion of the element.

3. A method for the nondestructive testing of weld clusters, as in claim 1, wherein said first current density is measured on a line connecting said current probe and said first weld and wherein said second current density is measured on a line connecting said current probe and said second weld.

4. A method for the nondestructive testing of weld clusters, as in claim 3, wherein said first and said second current densities are measured at equal distances from said current probe.

5. A method for the nondestructive testing of weld clusters, as in claim 1, wherein said current is injected from a constant current source.

6. A method for the nondestructive testing of weld clusters, as in claim 5, including the step of measuring the voltage across said constant current source.

* * * * *